(12) United States Patent
Padovani

(10) Patent No.: US 6,411,799 B1
(45) Date of Patent: *Jun. 25, 2002

(54) METHOD AND APPARATUS FOR PROVIDING TERNARY POWER CONTROL IN A COMMUNICATION SYSTEM

(75) Inventor: Roberto Padovani, San Diego, CA (US)

(73) Assignee: Qualcomm Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/984,817

(22) Filed: Dec. 4, 1997

(51) Int. Cl.⁷ .................................................. H04B 7/00
(52) U.S. Cl. ............................. 455/69; 455/63; 455/522
(58) Field of Search ............................. 455/69, 63, 522, 455/13.4, 70, 226.1, 226.2

(56) References Cited

U.S. PATENT DOCUMENTS

| | | | |
|---|---|---|---|
| 5,056,109 A | | 10/1991 | Gilhousen et al. ............. 379/59 |
| 5,241,690 A | * | 8/1993 | Larsson et al. ............. 455/54.1 |
| 5,267,262 A | * | 11/1993 | Wheatley, III ............... 455/69 |
| 5,305,468 A | | 4/1994 | Bruckert et al. .............. 455/69 |
| 5,485,486 A | * | 1/1996 | Gilhousen et al. ............. 455/69 |
| 5,506,865 A | | 4/1996 | Weaver, Jr. .................. 375/205 |
| 5,566,165 A | * | 10/1996 | Sawahashi et al. ........... 370/18 |
| 5,603,096 A | | 2/1997 | Gilhousen et al. ............. 455/69 |
| 5,604,730 A | * | 2/1997 | Tiedemann, Jr. .............. 455/69 |
| 5,604,766 A | * | 2/1997 | Dohi et al. .................... 455/69 |
| 5,822,318 A | * | 10/1998 | Tiedemann et al. ......... 370/391 |
| 5,893,035 A | * | 4/1999 | Chen .......................... 455/522 |
| 5,943,610 A | * | 8/1999 | Endo ........................... 455/69 |
| 6,070,085 A | * | 3/2000 | Bender et al. .............. 455/522 |
| 6,173,162 B1 | * | 1/2001 | Dahlman et al. ............. 455/69 |

FOREIGN PATENT DOCUMENTS

| | | |
|---|---|---|
| EP | 0312690 | 5/1988 |
| WO | 9700562 | 1/1997 |
| WO | 9715990 | 5/1997 |

* cited by examiner

Primary Examiner—Edward F. Urban
Assistant Examiner—Tilahun Gesesse
(74) Attorney, Agent, or Firm—Philip Wadsworth; Kent D. Baker; S. Hossain Beladi

(57) ABSTRACT

A power control system for communication systems which utilizes a ternary signaling scheme to reduce or eliminate limit cycling which occurs as the result of using a binary signaling scheme is described. The power control values (each having one of three possible values) are not encoded and are punctured onto the data to improve the response time of the power control loop and allow for dynamic adjustment of the transmit power. The power up, power down, and do nothing commands are represented by positive, negative, and zero values (e.g., +1, −1, and 0), respectively. The remote station decreases its transmit power if any base station issues a power down command, maintains its transmit power if no base stations issue a power down command and at least one base station issues a do nothing command, and increases its transmit power if all base station issue power up commands.

17 Claims, 6 Drawing Sheets

METHOD AND APPARATUS FOR PROVIDING TERNARY POWER CONTROL IN A COMMUNICATION SYSTEM

BACKGROUND OF THE INVENTION

I. Field of the Invention

The present invention relates to data communication. More particularly, the present invention relates to a novel and improved method and apparatus for providing power control in a communication system.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation techniques of CDMA have significant advantages over other modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM," also assigned to the assignee of the present invention and is incorporated by reference herein. Furthermore, the CDMA system can be designed to conform to the "TIA/EIA/IS-95 Mobile Station-Base Station Compatibility Standard for Dual-Mode Wideband Spread Spectrum Cellular System", hereinafter referred to as the IS-95 standard or TIA/EIA/IS-95.

CDMA, by its inherent nature of being a wideband signal, offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links to a mobile user or remote station through two or more base stations. Furthermore, path diversity may be obtained by exploiting the multipath environment through spread spectrum processing by allowing signals arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM," and U.S. Pat. No. 5,109,390 entitled "DIVERSITY RECEIVER IN A CDMA CELLULAR TELEPHONE SYSTEM," both assigned to the assignee of the present invention and incorporated by reference herein.

The reverse link refers to a transmission from a remote station to a base station. On the reverse link, each transmitting remote station acts as an interference to other remote stations in the network. The reverse link capacity is limited by the total interference due to transmissions from other remote stations. The CDMA system increases the reverse link capacity by transmitting fewer bits, thereby using less power and reducing interference when the user is not speaking.

To minimize interference and maximize the reverse link capacity, the transmit power of each remote station is controlled by three reverse link power control loops. The first power control loop adjusts the transmit power of the remote station by setting the transmit power inversely proportional to the power of the received forward link signal. In an IS-95 system, the transmit power of the remote station is given by $P_{out}=-73-P_{in}$ where $P_{in}$ is the power received by the remote station given in dBm, $P_{out}$ is the transmit power of the remote station given in dBm, and −73 is a constant. This power control loop is also referred to as the open loop.

The second power control loop adjusts the transmit power of the remote station such that the signal quality, as measured by the energy-per-bit-to-noise-plus-interference ratio $E_b/I_o$, of the reverse link signal received at the base station is maintained at a predetermined level. This level is referred to as the $E_b/I_o$ set point. The base station measures the $E_b/I_o$ of the reverse link signal received at the base station and transmits a reverse power control bit to the remote station on the forward traffic channel in response to the measured $E_b/I_o$. For IS-95 communication systems, the reverse power control bits are sent 16 times per 20 msec frame, or one power control bit per power control group, for an effective rate of 800 bps. The forward traffic channel carries the reverse power control bits along with the data from the base station to the remote station. This second loop is also referred to as the closed loop.

The CDMA communication system typically transmits packets of data as discrete data frames. Thus, the desired level of performance is typically measured by the frame-error-rate (FER). The third power control loop adjusts the $E_b/I_o$ set point such that the desired level of performance, as measured by the FER, is maintained. The required $E_b/I_o$ to maintain a given FER depends upon the propagation conditions. This third loop is also referred to as the outer loop. The power control mechanism for the reverse link is disclosed in detail in U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the assignee of the present invention and incorporated by reference herein.

The forward link refers to a transmission from the base station to the remote station. On the forward link, the transmit power of the base station is controlled for several reasons. A high transmit power from the base station can cause excessive interference with other signals received at the remote stations. Alternatively, if the transmit power of the base station is too low, the remote stations can receive erroneous data transmissions. Terrestrial channel fading and other known factors can affect the quality of the forward link signal as received by the remote station. As a result, each base station attempts to adjust its transmit power to maintain the desired level of performance at the remote station.

Power control on the forward link is especially important for data transmissions. Data transmission is typically asymmetric with the amount of data transmitted on the forward link being greater than on the reverse link. With an effective power control mechanism on the forward link, wherein the transmit power is controlled to maintain the desired level of performance, the overall forward link capacity can be improved.

A method and apparatus for controlling the forward link transmit power is disclosed in U.S. Pat. No. 6,035,209 which is a continued prosecution application of U.S. patent application Ser. No. 08/414,633, now abandoned, entitled "METHOD AND APPARATUS FOR PERFORMING FAST FORWARD POWER CONTROL IN A MOBILE COMMUNICATION SYSTEM", filed Mar. 31, 1995, assigned to the assignee of the present invention and incorporated by reference herein. In the method disclosed in U.S. Pat. No. 6,035,209, the remote station transmits an error-indicator-bit (EIB) message to the base station when a transmitted frame of data is received in error. The EIB can be either a bit contained in the reverse traffic channel frame or a separate message sent on the reverse traffic channel. In response to the EIB message, the base station increases or decreases its transmit power to the remote station.

One of the disadvantages of this method is the long response time. The processing delay encompasses the time interval from the time the base station transmits the frame with inadequate power to the time the base station adjusts its transmit power in response to the error message from the remote station. This processing delay includes the time it takes for (1) the base station to transmit the data frame with inadequate power, (2) the remote station to receive the data frame, (3) the remote station to detect the frame error (e.g. a frame erasure), (4) the remote station to transmit the error message to the base station, and (5) the base station to receive the error message and appropriately adjust its transmit power. The forward traffic channel frame must be received, demodulated, and decoded before the EIB message is generated. Then the reverse traffic channel frame carrying the EIB message must be generated, encoded, transmitted, decoded, and processed before the bit can be used to adjust the transmit power of the forward traffic channel.

Typically, the desired level of performance is one percent FER. Therefore, on the average, the remote station transmits one error message indicative of a frame error every 100 frames. In accordance with the IS-95 standard, each frame is 20 msec long. This type of EIB based power control works well to adjust the forward link transmit power to handle shadowing conditions, but due to its slow speed is ineffective in fading except in the slowest fading conditions.

A second method for controlling the forward link transmit power utilizes the $E_b/I_o$ of the received signal at the remote station. Since the FER is dependent on the $E_b/I_o$ of the received signal, a power control mechanism can be designed to maintain the $E_b/I_o$ at the desired level. This design encounters difficulty if data is transmitted on the forward link at variable rates. On the forward link, the transmit power is adjusted depending on the data rate of the data frame. At lower data rates, each data bit is transmitted over a longer time period by repeating the modulation symbol as described in TIA/EIA/IS-95. The energy-per-bit $E_b$ is the accumulation of the received power over one bit time period and is obtained by accumulating the energy in each modulation symbol. For an equivalent amount of $E_b$, each data bit can be transmitted at proportionally less transmit power at the lower data rates. Typically, the remote station does not know the transmission rate a priori and cannot compute the received energy-per-bit $E_b$ until the entire data frame has been demodulated, decoded, and the data rate of the data frame determined. Thus, the delay of this method is about that described in the aforementioned U.S. Pat. No. 6,035,209 and the rate is one power control message per frame. This is in contrast with the reverse link power control mechanism described above wherein one power control message (bit) is sent sixteen times per frame as specified by TIA/EIA/IS-95.

Other methods and apparatus for performing fast forward link power control are described in the aforementioned U.S. Pat. No. 6,035,209 and U.S. patent application Ser. No. 08/559,386, entitled "METHOD AND APPARATUS FOR PERFORMING FAST FORWARD POWER CONTROL IN A MOBILE COMMUNICATION SYSTEM", filed Nov. 15, 1995, U.S. Pat. No. 5,903,554, entitled "METHOD AND APPARATUS FOR MEASURING LINK QUALITY IN A SPREAD SPECTRUM COMMUNICATION SYSTEM", filed Sep. 27, 1996, U.S. Pat. No. 5,893,035 entitled "METHOD AND APPARATUS FOR PERFORMING DISTRIBUTED FORWARD POWER CONTROL", filed Sep. 16, 1996, and U.S. Pat. No. 6,075,974 entitled "ADJUSTMENT OF POWER CONTROL THRESHOLD/MEASUREMENTS BY ANTICIPATING POWER CONTROL COMMANDS THAT HAVE NOT BEEN EXECUTED", filed Nov. 20, 1996, all assigned to the assignee of the present invention and incorporated by reference herein.

For IS-95 systems, the fundamental difference between the forward and reverse links is that the transmission rate does not need to be known on the reverse link. As described in the aforementioned U.S. Pat. No. 5,5056,109, at lower rates, the remote station does not transmit continuously. When the remote station is transmitting, the remote station transmits at the same power level using the same waveform structure regardless of the transmission rate. The base station determines the value of a power control bit based on the $E_b/I_o$ measurement of the received reverse link signal and sends this power control bit to the remote station 16 times per frame. The base station can ignore power control bits corresponding to times when the remote station is not transmitting. This permits fast reverse link power control. However, the effective power control rate varies with the transmission rate. For TIA/EIA/IS-95, the rate is 800 bps for full rate frames and 100 bps for ⅛ rate frames.

An alternative reverse link architecture is described in the U.S. Pat. No. 5,930,230, entitled "HIGH DATA RATE CDMA WIRELESS COMMUNICATION SYSTEM", filed May, 28, 1996, assigned to the assignee of the present invention and incorporated by reference herein. In accordance with U.S. Pat. No. 5,930,230, an auxiliary pilot is introduced on the reverse link. The pilot level is independent of the transmission rate on the reverse link. This permits the base station to measure the pilot level and to send the reverse power control bit to the remote station at a constant rate.

These various methods for providing power control of the forward and reverse links in the prior art utilize one-bit power control command to direct the source unit (remote station or base station) to increase or decrease its transmit power depending on the measured $E_b/I_o$ of the received signal at the receiving unit (base station or remote station). The one-bit command minimizes the number of bit which are transmitted for the power control function, thus minimizing the overhead required by the system and reserving more resources for data transmission. However, the one-bit command inherently causes toggling (or limit cycling) of the power control since the transmit power is either increased or decreased at each power control group depending on the received value of the power control bit. Furthermore, due to processing delay, the transmit power can be adjusted in the wrong direction for several power control groups before correction is made, thereby magnifying the affect of limit cycling. The limit cycling can reduce the efficiency and performance of the communication system. A method is needed to control the transmit power of the source unit by utilizing the minimal number of bits while reducing or eliminating the limit cycling of the transmit power which is inherent with a one-bit power control mechanism.

SUMMARY OF THE INVENTION

The present invention is a novel and improved method and apparatus for providing power control in a communication system which utilizes a ternary signaling scheme. The present invention improves the performance of the communication system by reducing or eliminating limit cycling which is inherent in a binary signaling scheme. In the exemplary embodiment, power control values (each having one of three possible values) are punctured onto the data to improve the response time of the power control loop and allow for dynamic adjustment of the transmit power. The power control mechanism of the present invention can be utilized on the forward link and/or the reverse link. However, for simplicity, the present invention is described in the context of the reverse link power control.

It is an object of the present invention to provide a ternary power control signaling scheme. In the exemplary ternary signaling scheme, a power up command is represented by a positive value (e.g., +1), a power down command is represented by a negative value (e.g., −1), and a do nothing command is represented by a zero. The ternary signaling scheme minimizes the number of bits which is allocated for the power control function, thereby reserving more resources for data transmission.

It is another object of the present invention to improve the performance of the communication system by reducing or eliminating limit cycling in the power control loop. In the exemplary embodiment, a power control value comprises a power up, a power down, or a do nothing command. In the exemplary embodiment, if the quality of the received signal (e.g., as measured by the energy-per-bit-to-noise-plus-interference ratio $E_b/I_o$) is within a predetermined range, the base station transmits the do nothing command. The do nothing command minimizes limit cycling which is inherent in a binary signaling scheme. The do nothing command also minimizing variations in the transmit power of the remote station due to $E_b/I_o$ measurement uncertainty of the received signal at the base station.

It is yet another object of the present invention to improve the response time of the power control loop. In the exemplary embodiment, the power control values are transmitted to the remote station without encoding. Furthermore, the power control values are punctured onto the encoded data. At the remote station, the power control values can be demodulated and detected rapidly without having to endure the long decoding process. The quick response time improves the performance of the power control loop and can result in improved performance and increased capacity of the communication system.

It is yet another object of the present invention to provide a power control mechanism which supports handoff. The remote station can be in soft handoff with multiple base stations and receive identical or non-identical power control values from the base stations. At the remote station, the transmitted power control values are received, demodulated, and filtered. Identical power control values from multiple base stations or multiple signal paths are combined to produce an improved measurement of the power control value. Each independent power control value is compared against a set of thresholds to produce the corresponding received power control value. The received power control values from all base stations in communication with the remote station are then logically combined such that the remote station reduces its transmit power if any base station sends a power down command, does nothing if no base stations send a power down command and at least one base station sends a do nothing command, and increases its transmit power if all base stations send power up command.

It is yet another object of the present invention to provide for a reliable power control mechanism. The reverse power control bits which are deemed unreliable may be omitted from use in the power control loop, e.g., by maintaining the transmit power.

Although the present invention has been described for the reverse link power control, the inventive concept can be fully adapted for use in forward link power control.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
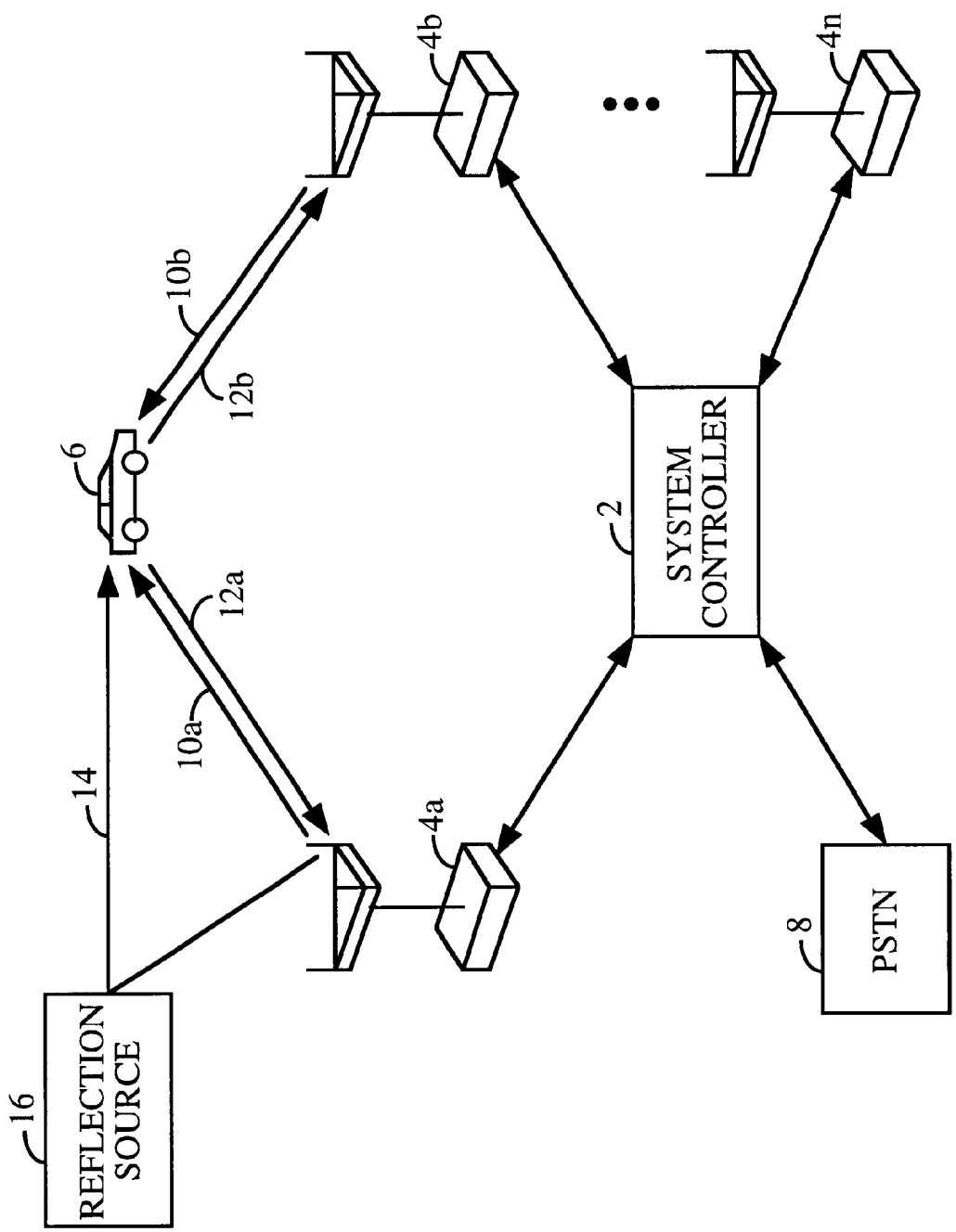
FIG. 1 is a diagram of the communication system of the present invention showing a plurality of base stations in communication with a remote station.

In the present invention, the base station transmits the reverse power control values along with the data on the forward traffic channel. The reverse power control values are used by the remote station to control its transmit power to maintain the desired level of performance (e.g., a predetermined frame-error-rate FER) at the base station while minimizing interference to other remote stations in the network. In the exemplary embodiment, each power control value comprises a power up command (e.g., +1), a power down command (e.g., −1), or a do nothing command (e.g., 0). In the exemplary embodiment, to minimize processing delays, the power control values are not encoded and are punctured onto the data (see FIG. 3). In this sense, puncturing is a process whereby one or more code symbols are replaced by the power control value.

In the exemplary embodiment, the base station measures the quality of the received reverse link signal in accordance with the method described in the aforementioned U.S. Pat. No. 5,506,109. In the exemplary embodiment, the quality of the received reverse link signal is indicated by a measured $E_b/I_o$. In the alternative embodiment, the quality of the reverse link signal, as received at the base station, can be determined by measuring the amplitude of the reverse link pilot signal or the forward power control bit (if one is utilized) which is transmitted by the remote station. In this alternative embodiment, the quality of the data bits are not measured directly, but rather inferred from the measured amplitude of the reverse link pilot signal or forward power control bits. This is reasonable since the forward power control bits and reverse link signal are equally affected by changes in the propagation environment. The alternative embodiment operates well if the amplitude of the data bits is maintained at a known ratio to the amplitude of the pilot signal or the forward power control bits. Other methods for measuring the quality of the reverse link signal at the base station can be utilized and are within the scope of the present invention.

In the exemplary embodiment, the base station compares the measured $E_b/I_o$ versus a set of set points comprising a first and a second set point. If the measured $E_b/I_o$ is above the first set point, the base station issues a power down command. If the measured $E_b/I_o$ is below the second set point, the base station issues a power up command. Finally, if the measured $E_b/I_o$ is between the first and second set points, the base station issues a do nothing command. The set points can be adjusted based on a set of parameters, including the performance requirement of the system and the measurement uncertainty of the received reverse link signal.

In the exemplary embodiment, one power control value is transmitted to a respective remote station for each power control group. For an exemplary IS-95 communication system, each power control group is 1.25 msec in duration. Transmitting the power control values at evenly spaced intervals can result in the base station sending out power control values to multiple remote stations at the same time. This can result in a peak in the transmit power which can possibly reduce capacity. To avoid this, the power control values can be pseudo-randomly positioned within the power control group. This can be achieved by partitioning the power control group into a predetermined number of positions (e.g., 24 for IS-95 systems) and pseudo-randomly selecting (e.g., with a long PN sequence) the position in which to puncture in the power control value. For IS-95 systems, only one of the first 16 positions within the power control group is selected as a starting position of the power control value and the last 8 positions are not selected.

In the exemplary embodiment, the power control values are transmitted using a ternary signaling scheme having the exemplary values described above (e.g., +1, 0, −1). With the use of a ternary signaling scheme, it may not be necessary to randomize the position of the power control values. Preferably, by placing the power control values in the earlier portion of the power control group, it may be possible to reduce the processing delay of the power control loop and thereby improve performance. However, the power control values can be placed in various locations of the power control group to satisfy other system considerations and are within the scope of the present invention.

At the remote station, the transmitted power control value is received, demodulated, and processed. In particular, demodulated power control symbols are accumulated over the duration of a power control value. Next, identical power control values from multiple base stations or multipaths are accumulated. Each resultant independent power control value is then compared against a set of thresholds to provide a corresponding received power control value having a value of either +1, 0, or −1. The received power control values, one for each independent power control value, are then logically combined to provide a single power control command which directs the remote station to decrease its transmit power if any base station issues a power down command, do nothing if no base stations issue a power down command and at least one base station issues a do nothing command, and increase its transmit power if all base stations issue power up commands.

Typically, the reverse power control values are transmitted to the remote station at a low transmit power level. Furthermore, the power control values can be transmitted from multiple base stations within the communication system. A more accurate measurement of the amplitude of the power control values can be obtained by receiving the power control values from various base stations or multipaths of the same base station, adjusting the phase and amplitude of the power control values in accordance with the phase and amplitude of the pilot signal from the respective base station or multipath, and filtering the adjusted amplitude of the power control values. The filtered amplitude of the power control values can be combined, where appropriate, and used to control the transmit power of the remote station such that the quality of the reverse link signal received at the base station is maintained at the desired level.

In order to improve the effectiveness of the power control mechanism, e.g. to combat slow fading in the channel, the power control loop is designed to operate at a high rate. In the exemplary IS-95 system, the power control values are transmitted at 800 bps. Thus, the transmit power of the remote station can be adjusted at rates up to 800 times per second. However, because the power control values are sent uncoded and with minimal energy, some power control values may not be received satisfactorily at the remote station. A remote station may elect to ignore any power control value which it considers to be sufficiently unreliable.

In the exemplary embodiment, to minimize processing delay, the power control values are transmitted without coding and are punctured onto the data. However, for communication system wherein higher level of reliability is required, the power control values can be encoded along with the data or with a separate code provided just for the power control values. The use of coding to improve the reliability of the received power control values is within the scope of the present invention.

For simplicity, the present invention is described in the context of the reverse link power control, wherein the base station commands the remote stations to adjust their respective transmit power. It is readily apparent to those skilled in the art that the present invention can be applied to the forward link power control. Thus, forward link power control utilizing the inventive concept described herein is within the scope of the present invention.

I. Circuit Description

Referring to the figures, FIG. 1 represents an exemplary communication system of the present invention which comprises multiple base stations 4 in communication with multiple remote stations 6 (only one remote station 6 is shown for simplicity). System controller 2 connects to all base stations 4 in the communication system and the public switched telephone network (PSTN) 8. System controller 2 coordinates the communication between users connected to PSTN 8 and users on remote stations 6. Data transmission from base stations 4 to remote stations 6 occurs on the forward link through signal paths 10 and transmission from remote stations 6 to base stations 4 occurs on the reverse link through signal paths 12. The signal path can be a straight path, such as signal path 10a, or a reflected path, such as signal path 14. Reflected path 14 is created when the signal transmitted from base stations 4a is reflected off reflection source 16 and arrives at remote stations 6 through a different path than the line of sight path 10a. Although illustrated as a block in FIG. 1, reflection source 16 is the results of artifacts in the environment in which remote stations 6 is operating, e.g. a building or other structures.

Figure 2:
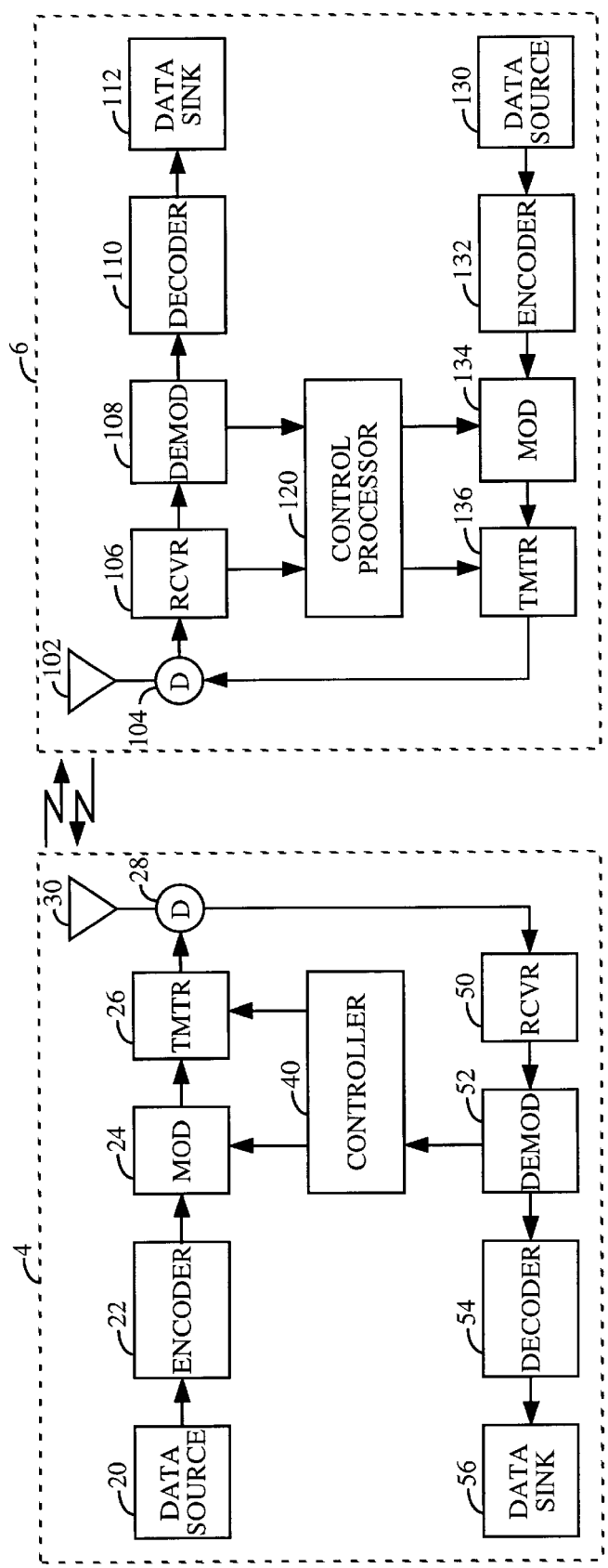
FIG. 2 is an exemplary block diagram of the base station and the remote station.
Figure 3:
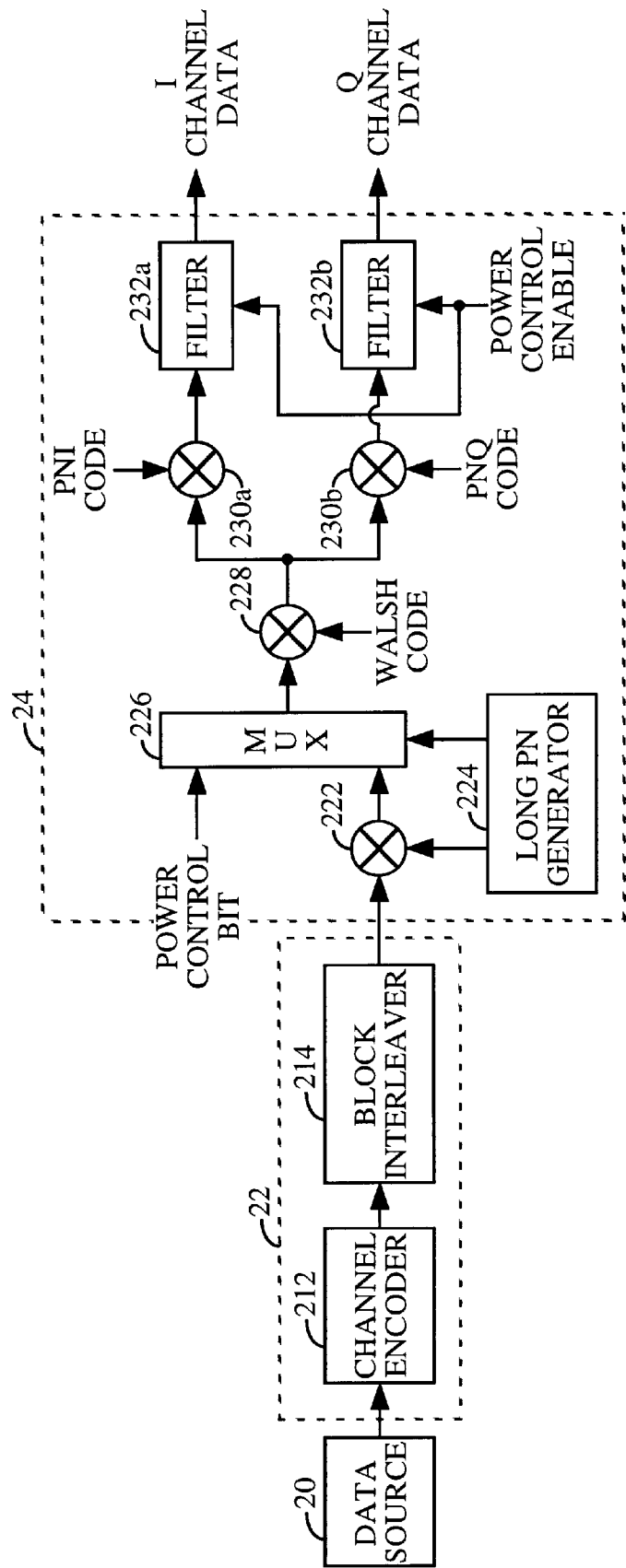
FIG. 3 is an exemplary block diagram of the forward traffic channel.

An exemplary block diagram of base stations 4 and remote stations 6 of the present invention is shown in FIG. 2. Data transmission on the forward link originates from data source 20 which provides the data to encoder 22. An exemplary block diagram of encoder 22 is shown in FIG. 3. Within encoder 22, channel encoder 212 encodes the data in accordance with the encoding format of the system. For an exemplary IS-95 system, channel encoder 212 performs CRC encoding, code tail bit insertion, convolutional encoding and symbol repetition as described in the aforementioned U.S. Pat. No. 5,103,359. The resultant symbols are provided to block interleaver 214 which reorders the symbols and provides the interleaved data to modulator (MOD) 24.

An exemplary block diagram of modulator 24 which conforms to the IS-95 standard is shown in FIG. 3. Within modulator 24, the interleaved data is scrambled by multiplier 222 with the long PN code such that the data can only be received by the remote stations 6 for which the data is destined. The long PN spread data is multiplexed through multiplexer (MUX) 226 and provided to multiplier 228 which covers the data with the Walsh code corresponding to the traffic channel assigned to the destination remote stations 6. The Walsh covered data is provided to multipliers 230a and 230b and further spread with the short PNI and PNQ codes, respectively. The short PN spread data from multipliers 230a and 230b are provided to filters 232a and 232b, respectively, which provide lowpass filtering of the data. The I channel data and Q channel data from filters 232a and 232b, respectively, are provided to transmitter (TMTR) 26 (see FIG. 2) which filters, modulates, upconverts, and amplifies the signal. The modulated signal is routed through duplexer 28 and transmitted from antenna 30 on the forward link through signal path 10. Duplexer 28 may not be used in some base station designs.

Figure 7:
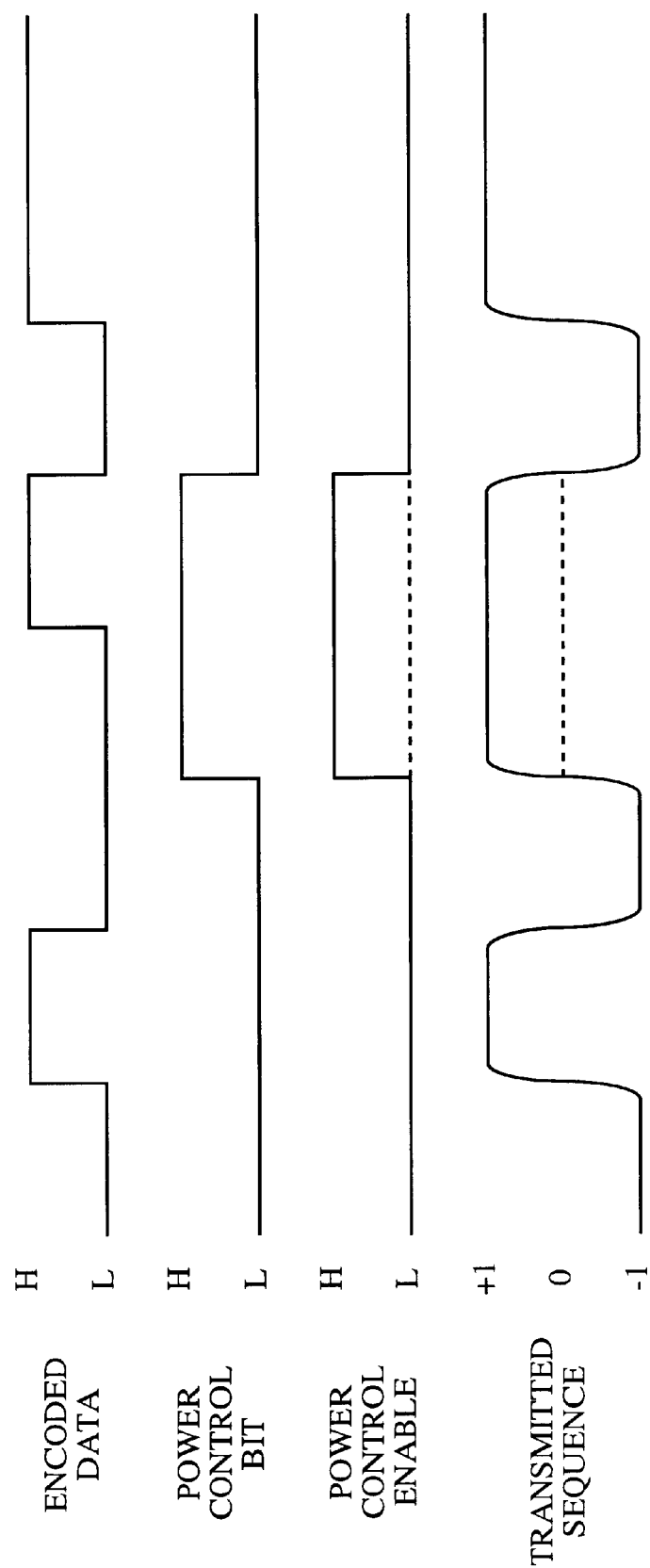
FIG. 7 is an exemplary timing diagram of the reverse link power control signals.

In the exemplary implementation shown in FIG. 3, the power control value comprises the power control bit and the power control enable. In the exemplary embodiment, the power control bit is a one-bit command which is high (e.g., 1) to command remote station 6 to increase its transmit power and low (e.g., 0) to command a decrease in the transmit power. In the exemplary embodiment, the power control enable is a one-bit command which is high (e.g., 1) to allow the power control bit to be processed and provided to the output of filter 232 and low (e.g., 0) to reset the output of filters 232 to a midscale value (0) for the do nothing command. This is illustrated in FIG. 7 wherein a low power control enable is shown by the dashed line and a high power control enable is shown by the solid line. It can be noted in FIG. 7 that the transmitted sequence (e.g., I channel data and Q channel data) is at midscale when the power control enable is low as shown by the dashed line.

In the exemplary embodiment, the I channel data and the Q channel data are modulated by the inphase and quadrature sinusoids, respectively. By equating the do nothing with a value of zero, the modulated I and Q signals is zero for the duration of the power control value. Thus, base station 4 does not transmit any energy to remote station 6 for the duration of the power control value when transmitting the do nothing command.

In the exemplary embodiment, one reverse power control value is punctured onto the data stream for each power control group. The duration of each power control value is predetermined and can be made dependent on the date rate of the traffic channel. In addition, the location at which the reverse link power control value is punctured can be fixed or pseudo-randomly selected with the long PN sequence from long PN generator 224 which is shown in FIG. 3. MUX 226 is used to puncture the reverse power control bits into the data stream. The output of MUX 226 contains both encoded data bits and reverse power control bits. The exemplary definition for the power control bit and power control enable is listed in Table 1.

TABLE 1

| Power Control Bit | Power Control Enable | Power Control Value | Remote Station Action |
|---|---|---|---|
| 1 | 1 | +1 | power up |
| 0 | 1 | −1 | power down |
| X | 0 | 0 | do nothing |

Alternatively, the power control value (e.g., +1, 0, and −1) can be directly punctured onto the data provided to filter 232 through a pair of MUXes interposed between mixers 230 and filters 232 (not shown in FIG. 3). In this embodiment, the short PN spread data is mapped to a new signal space corresponding to that of the power control values. For example, a high in the short PN spread data can be mapped to +1 and a low in the PN spread data can be mapped to −1.

Referring to FIG. 2, at remote station 6, the forward link signal is received by antenna 102, routed through duplexer 104, and provided to receiver (RCVR) 106. Receiver 106 filters, amplifies, demodulates, and quantizes the signal to obtain the digitized I and Q baseband signals. The baseband signals are provided to demodulator (DEMOD) 108. Demodulator 108 despreads the baseband signals with the short PNI and PNQ codes, decovers the despread data with the Walsh code identical to the Walsh code used at base station 4, despreads the Walsh decovered data with the long PN code, and provides the demodulated data to decoder 110.

Within decoder 110, a block de-interleaver reorders the symbols of the demodulated data and provides the de-interleaved data to a channel decoder which decodes the data in accordance with the encoding format used at channel encoder 212. The decoded data is provided to data sink 112.

II. Detection of the Power Control Values

Figure 4:
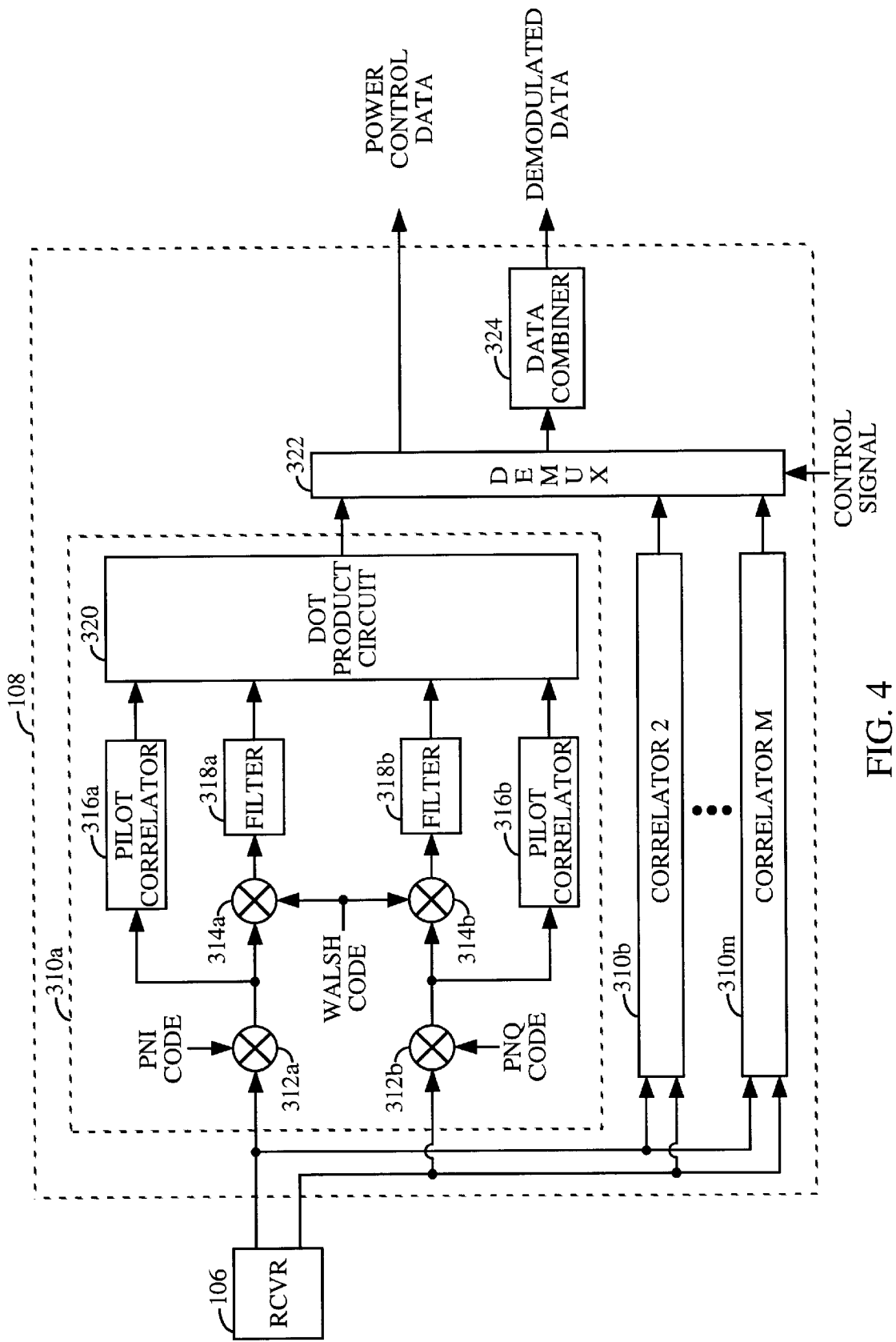
FIG. 4 is an exemplary block diagram of the demodulator within the remote station.

A block diagram of an exemplary demodulator 108 for detecting the received reverse link power control values is shown in FIG. 4. The digitized I and Q baseband signals from receiver 106 are provided to a bank of correlators 310. Each correlator 310 can be assigned to a different signal path from the same base station 4 or a different transmission from a different base station 4. Within each assigned correlator 310, the baseband signals are despread with the short PNI and PNQ codes by multipliers 312a and 312b, respectively. The short PNI and PNQ codes within each correlator 310 can have a unique offset matching the particular offset associated with the base station 4 from which the signal is transmitted and further corresponding to the propagation delay experienced by the signal being demodulated by that correlator 310. The short PN despread data is decovered by multipliers 314 with the Walsh code assigned to the traffic channel being received by the correlator 310. The decovered data is provided to filters 318 which accumulate the energy of the decovered data over a symbol time.

For IS-95 system wherein the pilot signal is transmitted on a separate pilot channel which is superimposed on the traffic channel, the short PN despread data from multipliers 312 also contain the pilot signal. For IS-95 system, the pilot signal is covered with the all zero sequence corresponding to Walsh code 0. Thus, no Walsh decovering is necessary to obtain the pilot signal. The short PN despread data is provided to pilot correlators 316 which perform the lowpass filtering and/or symbol accumulation of the despread data to extract the pilot signal from the received signal.

The two complex signals (or vectors) corresponding to the filtered pilot signal from pilot correlators 316 and the filtered data from filters 318 are provided to dot product circuit 320 which computes the dot product of the two vectors in a manner well known in the art. An exemplary dot product circuit 310 is described in detail in U.S. Pat. No. 5,506,865, entitled "PILOT CARRIER DOT PRODUCT CIRCUIT", assigned to the assignee of the present invention and incorporated by reference herein. Dot product circuit 320 projects the vector corresponding to the filtered data onto the vector corresponding to the filtered pilot signal, multiplies the amplitude of the vectors, and provides a signed scalar output $s_m(j)$ to demultiplexer (DEMUX) 322. The notation $s_m(j)$ is used to denote the output from the $m^{th}$ correlator 320$m$, during the $j^{th}$ symbol period. Remote station 6 has knowledge of whether the $j^{th}$ symbol period of the current frame corresponds to a data bit or a reverse power control value. Accordingly, DEMUX 322 routes the vector of correlator outputs, $\underline{S}(j)=\{s_1(j), s_2(j), \ldots, s_M(j)\}$, to either data combiner 324 or control processor 120. Data combiner 324 sums its vector inputs, despreads the data using the long PN code, and provides the demodulated data to decoder 110.

Figure 5:
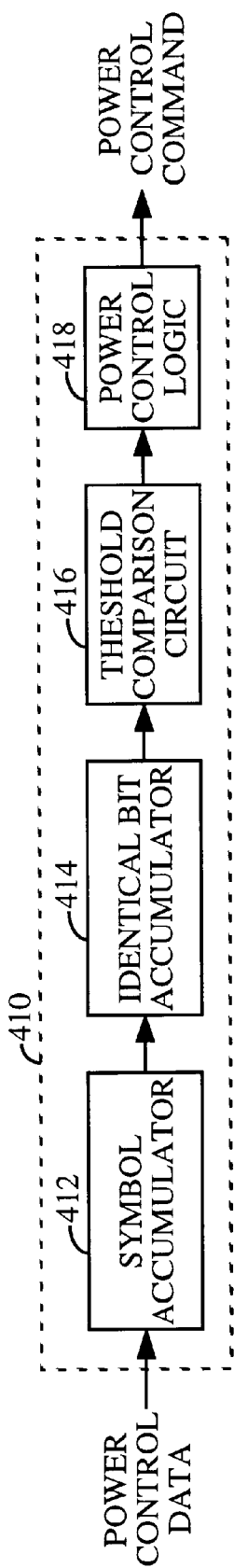
FIG. 5 is an exemplary block diagram of the power control processor within the remote station.

The power control data comprising the demodulated power control symbols are provided to power control processor 410 which is shown in FIG. 5. Power control processor 410 can be incorporated within control processor 120 shown in FIG. 2. Within power control processor 410, the demodulated power control symbols are provided to symbol accumulator 412 which accumulates the demodulated power control symbols $s_m(j)$ over the duration of a power control value to produce the demodulated power control values $b_m(i)$. For example, for IS-95 system, each power control value has a duration of two modulation symbols or 128 PN chips. In this case, symbol accumulator 412 accumulates the demodulated power control symbols over 128 PN chips to produce the demodulated power control value $b_m(i)$. The notation $b_m(i)$ is used to denote the reverse power control value corresponding to the $m^{th}$ correlator 310$m$, for the $i^{th}$ power control group. The vector of demodulated power control values $\underline{B}(i)=\{b_1(i), b_2(i), \ldots, b_M(i)\}$ is provided to identical bit accumulator 414.

In accordance with IS-95 standard, when more than one base station 4 is in communication with the same remote station 6, the base stations 4 can be configured to transmit either identical or non-identical reverse link power control values. Base stations 4 are typically configured to send identical power control values when they are physically located at the same location, such as when they are different sectors of a cell. Base stations 4 which do not send the same power control values are typically those which are physically located at different locations. The IS-95 standard also specifies a mechanism by which base stations 4 which are configured to send identical power control values are identified to remote station 6. Furthermore, when remote station 6 is receiving the transmission of a single base station 4 through multiple propagation paths, the reverse power control values received on these paths are inherently identical. Identical bit accumulator 414 combines the reverse power control values $b_m(i)$ which are known to be identical. The output of identical bit accumulator 414 is thus a vector of independent reverse power control values, $\underline{B}'(i)=\{b'_1(i), b'_2(i), \ldots, b'_N(i)\}$, corresponding to the N independent reverse power control streams. Each independent power control stream $b'_n(i)$ comprises the summation of the identical power control values corresponding to that stream (e.g., from different sectors in communication with remote station 6 or from different multipaths). The independent power control value can be calculated in accordance with the following equation:

$$b'_n(i) = \frac{1}{K}\sum_{k=0}^{K-1} b_k(i), \quad (1)$$

where K is the number of correlators 310 receiving identical power control value for the $n^{th}$ independent reverse power control stream (e.g, from different base stations 4 or different multipaths).

The ternary channel of the present invention is also commonly referred to as an erasure channel. Instead of using one threshold (which is typically zero for a binary +/−1 communication channel), two thresholds are used for the ternary channel of the present invention. The first threshold is set above zero and the second threshold is set below zero. If the amplitude of the received signal is above the first threshold a +1 is declared, if the amplitude is below the second threshold a −1 is declared, and if the amplitude is between the first and second thresholds an erasure is declared.

The vector of independent power control values $\underline{B}'(i)$ is provided to threshold comparison circuit 416 which compares each independent power control value $b'_n(i)$ against a corresponding set of predetermined thresholds. If $b'_n(i)$ is above a first threshold $th1_n$ the received power control value $b''_n(i)$ corresponding to $b'_n(i)$ is set to +1, if $b'_n(i)$ is below a second threshold $th2_n$ the received power control value $b''_n(i)$ is set to −1, and if $b'_n(i)$ is between the first and second thresholds the received power control value $b''_n(i)$ is set to zero.

The first and second thresholds corresponding to each independent power control value can be set in accordance with a set of parameters, such as the number of identical power control values being combined to generate the independent power control value and the variation in the measured amplitude of the received signal. As an example, the first threshold can be set at 0.5 of the nominal full scale value and the second threshold can be set at −0.5 of the nominal full scale value, and these threshold values can be adjusted in accordance with the parameters described above. The output from threshold comparison circuit 416 comprises a vector of received power control values $\underline{B}''(i)=\{b''_1(i), b''_2(i), \ldots, b''_N(i)\}$, which each received power control value $b''_n(i)$ having a value of either +1, −1, or zero. The vector of received power control values $\underline{B}''(i)$ is provided to power control logic 418.

In accordance with the IS-95 standard, remote station 6 decreases its transmit power if any one of the base stations 4 issues a power down command. This mechanism minimizes interference and improves system capacity while ensuring that the reverse link signal is properly received by at least one base station 4. In the exemplary embodiment, the same power control mechanism is utilized in conjunction with the ternary power control signaling scheme of the present invention. In the exemplary embodiment, if any of the received power control values $b''_n(i)$ is negative, remote station 6 decreases its transmit power. Furthermore, if no received power control values $b''_n(i)$ are negative and at least one received power control values $b''_n(i)$ is zero, remote station 6 does not adjust its transmit power. Finally, if all received power control values $b''_n(i)$ are positive, remote station 6 increases its transmit power. Power control logic 418 processes the vector of received power control values $\underline{B}''(i)$ using the logical scheme described above. The output of power control logic 418 is a single power control value (or a power control command) which dictates remote station 6 to either increase, decrease, or maintain its transmit power. This power control value is provided to transmitter 136 (see FIG. 2) which adjusts the transmit power of remote station 6 accordingly.

In the exemplary embodiment, the reverse power control values are not encoded and, therefore, are especially vulnerable to errors caused by interference. The fast response time of the closed loop reverse link power control minimizes the effect of such errors on the performance of the reverse link power control since these erroneous adjustments or non-adjustments of the transmit power of remote station 6 can be compensated for in subsequent power control groups.

In the exemplary embodiment described herein, the reverse link power control has been described in such a way as to be compatible with the IS-95 standard. The practice of the present invention is not dependent on any particular communication system or implementation. It should be obvious to those skilled in the art that other implementations to perform the power control processing as described herein can be contemplated and are within the scope of the present invention.

III. Generation of the Power Control Values

Referring to FIG. 2, at base station 4, the reverse link signal is received by antenna 30, routed through duplexer 28, and provided to receiver (RCVR) 50. Receiver 50 filters, amplifies, demodulates, and quantizes the signal to obtain the digitized I and Q baseband signals. The baseband signals are provided to demodulator (DEMOD) 52 which despreads the baseband signals with the short PNI and PNQ codes. For IS-95 systems, demodulator 52 signal maps the received Walsh sequence to the corresponding Walsh code. In particular, the despread data is grouped into blocks of 64 chips and assigned a Walsh code having a Walsh sequence closest to the block of despread data. This signal mapping is performed by a fast Hadamard transform filter as described in the aforementioned U.S. Pat. No. 5,103,459. The Walsh code comprises the demodulated data which is provided to decoder 54.

Within decoder 54, a block de-interleaver reorders the symbols of the demodulated data and provides the de-interleaved data to a channel decoder which decodes the data in accordance with the encoding format used at encoder 132. For IS-95 systems, decoder 54 perform Viterbi decoding and CRC check of the decoded data. The CRC checked data is provided to data sink 56. The functions of receiver 50 and demodulator 52 for IS-95 systems are further described in U.S. Pat. No. 5,103,459.

In the exemplary IS-95 system, the transmit power of remote station 6 is adjusted to maintain the requisite reverse link signal quality (e.g., as measured by the energy-per-bit-to-noise-plus-interference ratio $E_b/I_o$ of the reverse link signal as received at base station 4). In the exemplary embodiment, the measured $E_b/I_o$ is compared against the $E_b/I_o$ set points and a power control value is generated in response thereto. The $E_b/I_o$ set points are, in turn, adjusted to maintain the desired frame-error-rate (FER).

Figure 6:
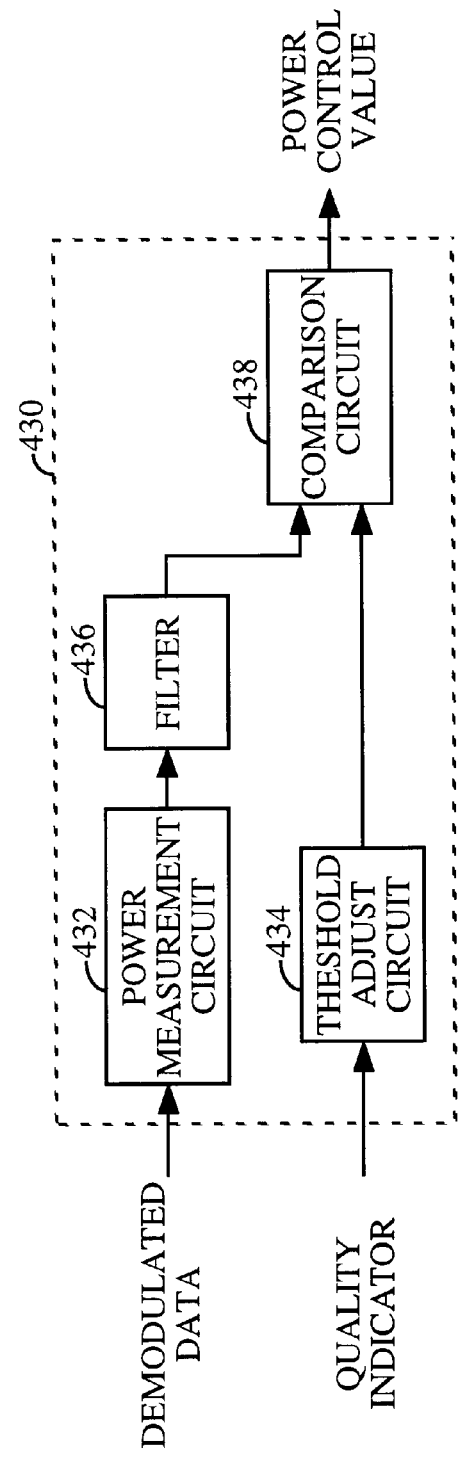
FIG. 6 is an exemplary block diagram of the power detector within the base station.

As shown in FIG. 6, the demodulated data is provided to power detector 430 within controller 40. Within power detector 430, the demodulated data is provided to power measurement circuit 432 which computes the power of the received reverse traffic channel and the total received power. A method and apparatus for measuring the quality of the received signal are described in detail in the aforementioned U.S. Pat. No. 5,506,109. In summary, the power of the received reverse traffic channel can be computed from the demodulated data and the total received power can be computed from the despread data. The ratio of these two measurements comprises the measured $E_b/I_o$ which is then provided to filter 436. Filter 436 averages the measured $E_b/I_o$ over a predetermined interval and provides the averaged $E_b/I_o$ to comparison circuit 438. Filter 436 can be implemented as a finite-impulse response (FIR) filter or other filter designs which are known in the art. Furthermore, filter 436 can be designed such that a tradeoff between reliable measurements and minimal response time can be obtained for a particular system requirement.

In the exemplary embodiment, a quality indicator of the received reverse link signal (such as the FER) is provided to threshold adjust circuit 434 which sets two $E_b/I_o$ set points (comprising the first and second set points) in response thereto. In the exemplary embodiment, if the averaged $E_b/I_o$ is above the first set point, the received $E_b/I_o$ is better than necessary and the transmit power of remote station 6 is adjusted downward by issuing a power control value of −1. Alternatively, if the averaged $E_b/I_o$ is below the second set point, the received $E_b/I_o$ is worse than required and the transmit power of remote station 6 is adjusted upward by issuing a power control value of +1. Finally, if the averaged $E_b/I_o$ is between the first and second set points, the received $E_b/I_o$ is approximately as required and the transmit power of remote station 6 is maintained by issuing a do nothing command having a power control value of zero. The difference between the first and second set points comprises the desired operating range of the received $E_b/I_o$ and can be tailored to a particular application. In particular, the difference between the first and second thresholds can be set to account for measurement uncertainty of the received $E_b/I_o$. For example, if the received $E_b/I_o$ can only be measured with a ±0.5 dB of certainty, the difference between the first and second set points should be set at least 1.0 dB apart.

The first and second thresholds can be adjusted based on the performance requirement of the system, e.g., as determine by the FER of the received reverse link signal. If the received FER is higher than required, the set points can be increased, thereby causing the power control loop to adjust the transmit power of remote station 6 upward and improving the received $E_b/I_o$. Alternatively, if the received FER is lower than necessary, the set points can be decreased, thereby causing the power control loop to adjust the transmit power of remote station 6 downward to improve capacity.

As described in the aforementioned U.S. Pat. No. 5,109,390, remote station 6 can be in soft handoff with multiple base stations 4 or in softer handoff with multiple base stations 4 (or sectors). While in handoff, the base stations 4 can transmit identical or non-identical power control values to remote station 6. If non-identical power control values are transmitted, each base station 4 acts independent of other base stations 4. However, if identical power control values are transmitted, these power control values are sent to a central processor, such as system controller 2, which evaluates the power control values from all base stations 4. In the exemplary embodiment, system controller 2 directs remote station 6 to decrease its transmit power if any base station 4 issues a power down command, directs remote station 6 to maintain its transmit power if no base stations 4 issue a power down command and at least one base station 4 issues a do nothing command, and directs remote station 6 to increase its transmit power if all base stations 4 issue power up commands. The identical power control value is then sent by system controller 2 to all base stations 4 in communication with remote station 6 for transmission on the forward link.

The present invention has been described in detail for the reverse link power control of an IS-95 communication system. It is readily apparent to those skilled in the art that the ternary signaling scheme of the present invention can be utilized for the reverse link power control of other communication systems. One such other communication system is the exemplary high rate packet data communication system described in U.S. patent application Ser. No. 08/963,386, entitled "METHOD AND APPARATUS FOR HIGH RATE PACKET DATA TRANSMISSION", filed Nov. 3, 1997, assigned to the assignee of the present invention and incorporated by reference herein. In this packet data communication system, a power control subchannel is assigned to each remote station in communication with the transmitting base station. Each power control subchannel is used to transmit one power control value to the respective remote station at each time slot to command the remote station to either power up, power down, or maintain its transmit power. In this packet data communication system, the power control values for multiple remote stations are transmitted during a power control burst which is multiplexed onto the traffic channel at a fixed location within each transmission time slot.

The present invention has been described in detail for the reverse link power control of a communication system. It is also readily apparent to those skilled in the art that the ternary signaling scheme of the present invention can be extended to the forward link power control, and this is within the scope of the present invention.

The ternary signaling scheme of the present invention can be further extended to provide transmission of other control signals requiring more than two states. For example, in communication systems capable of transmission at one of a number of data rates, the base station can transmit a rate control value to the remote station to inform the remote station of either a rate increase, a rate decrease, or no change in rate for the upcoming data transmission. The use of the ternary signaling scheme minimizes the number of bits required to transmit the control signal while preventing or eliminating limit cycling which results from transmitting a binary control value.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for controlling a transmit power in a communication system comprising the steps of:
    measuring a quality of a received signal;
    comparing said quality of said received signal against a set of set points, said set of set points comprising a first set point and a second set point; and
    generating a power control value in response to said comparing step;
    wherein said power control value comprises one of three values, said three values corresponding to a power up command, a power down command, and a do nothing command, and wherein said power control value corresponds to said power up command if said quality of said received signal is above said first set point, to said power down command if said quality of said received signal is below said second set point, and to said do nothing command if said quality of said received signal is between said first and second set points;
    transmitting said power control value to a destination station; and
    wherein said transmit power of said destination station is adjusted in accordance with a received power control value;
    processing a transmitted power control value at said destination station to provide said received power control value;
    wherein said processing step comprises the steps of:
        receiving at least one signal path corresponding to said transmitted power control value;
        demodulating each of said at least one signal path to obtain a pilot signal and a filtered data;
        computing a dot product of said pilot signal and said filtered data to obtain demodulated power control symbols; and
        accumulating said demodulated power control symbols over a period of said power control value to obtain said received power control value.

2. The method of claim 1 wherein said quality of said received signal is based on a measured energy-per-bit-to-noise-plus-interference ratio $E_b/I_o$ of said received signal.

3. The method of claim 1 wherein said set of set points is adjusted based on a performance requirement of said communication system.

4. The method of claim 3 wherein said performance requirement is based on a frame-error-rate of said received signal.

5. The method of claim 4 wherein said first set point is decreased if said frame-error-rate is higher than required.

6. The method of claim 4 wherein said second set point is increased if said frame-error-rate is lower than necessary.

7. The method of claim 1 wherein said first and second set points are set based on a measurement uncertainty of said quality of said received signal.

8. The method of claim 7 wherein a difference between said first and second set points is set equal to or greater than said measurement uncertainty of said quality of said received signal.

9. The method of claim 1 wherein said processing step further comprises the step of:
    comparing an output from said accumulating step against a set of thresholds to obtain said received power control value.

10. The method of claim 1 wherein said power control value is not encoded.

11. The method of claim 1 wherein said power control value is punctured onto a data transmission.

12. The method of claim 1 wherein said power control value is pseudo-randomly positioned within a power control group.

13. A method for adjusting a transmit power in a communication system comprising the steps of:
    receiving at least one transmitted power control value;
    processing said at least one transmitted power control value to obtain a power control command; and
    adjusting said transmit power in accordance with said power control command;
    wherein said power control command comprises one of three values, said three values corresponding to a power up command, a power down command, and a do nothing command, and wherein said power control value corresponds to said power up command if a quality of a received signal at a base station transmitting said power control value is above a first set point, to said power down command if said quality of said received signal at said base station transmitting said power control values is below a second set point, and to said do nothing command if said quality of said received signal at said base station transmitting said power control value is between said first and second set points;

receiving at least one signal path corresponding to said at least one transmitted power control value;

demodulating each of said at least one signal path to obtain demodulated power control symbols;

accumulating said demodulated power control symbols over a period of said transmitted power control value;

combining identical power control values from said accumulating step to obtain independent power control values;

logically combining said independent power control values to obtain said power control command.

14. The method of claim 13 wherein said processing step further comprises the step of:

comparing independent power control values against corresponding sets of thresholds to obtain received power control values; and wherein said logically combining step is performed on said received power control values to obtain said power control command.

15. The method of claim 13 wherein said transmit power is adjusted upward if at least one independent power control value is a power down command.

16. The method of claim 13 wherein said transmit power is maintained if no independent power control values are power down command and at least one independent power control value is a do nothing command.

17. The method of claim 13 wherein said transmit power is increased if all independent power control values are power up commands.

* * * * *